United States Patent [19]
Coulter et al.

[11] 3,818,476
[45] June 18, 1974

[54] NAVIGATION AID TRANSMITTER-MONITOR SYSTEM

[75] Inventors: J. Roland Coulter, Harrison, N.Y.; Warren Hundley, Upper Saddle River, N.J.; Sol N. Koblick, New York, N.Y.

[73] Assignee: Tull Aviation Corporation, Armonk, N.Y.

[22] Filed: June 27, 1972

[21] Appl. No.: 266,533

[52] U.S. Cl......... 343/100 AP, 343/108 R, 343/109
[51] Int. Cl. .............................................. H04b 7/00
[58] Field of Search........... 343/100 AP, 108 R, 109

[56] References Cited
UNITED STATES PATENTS 3,302,202  1/1967  Gouriet........................... 343/108 R
3,713,160  1/1973  Becavin....................... 343/100 AP
3,716,864  2/1973  Stover............................... 343/109

*Primary Examiner*—Maynard R. Wilbur
*Assistant Examiner*—S. C. Buczinski
*Attorney, Agent, or Firm*—Curtis Ailes

[57] ABSTRACT

The monitor includes a plurality of separate monitor receiver antennas arranged at different displacement positions in space with respect to a course plane defined by the radio navigation aid transmitter being monitored. Separate monitor receiving channels are provided for each of said monitor antennas and respectively connected to said monitor receiver antennas for separately determining the presence of deviations of the received signals from the values within predetermined limits.

19 Claims, 5 Drawing Figures

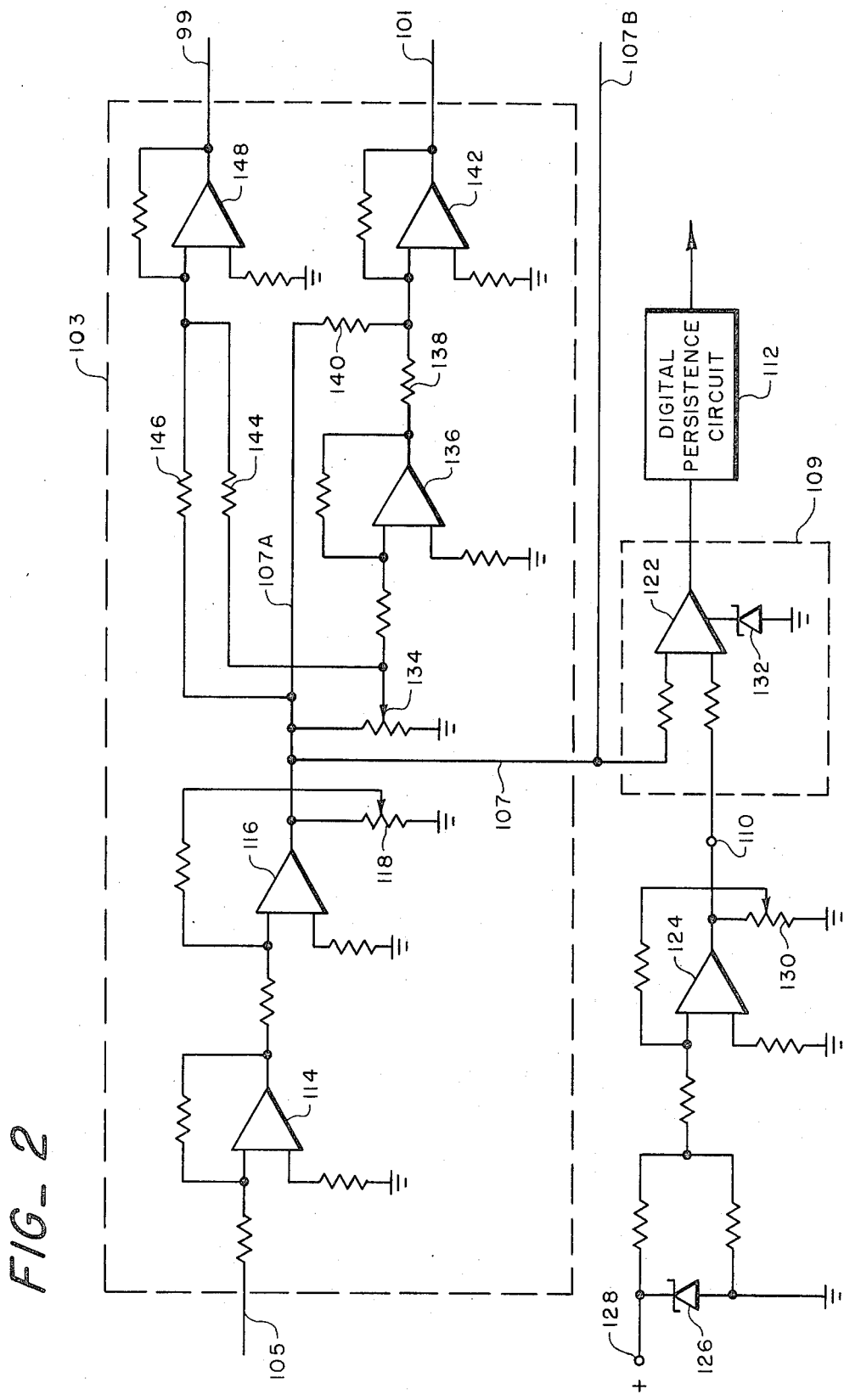

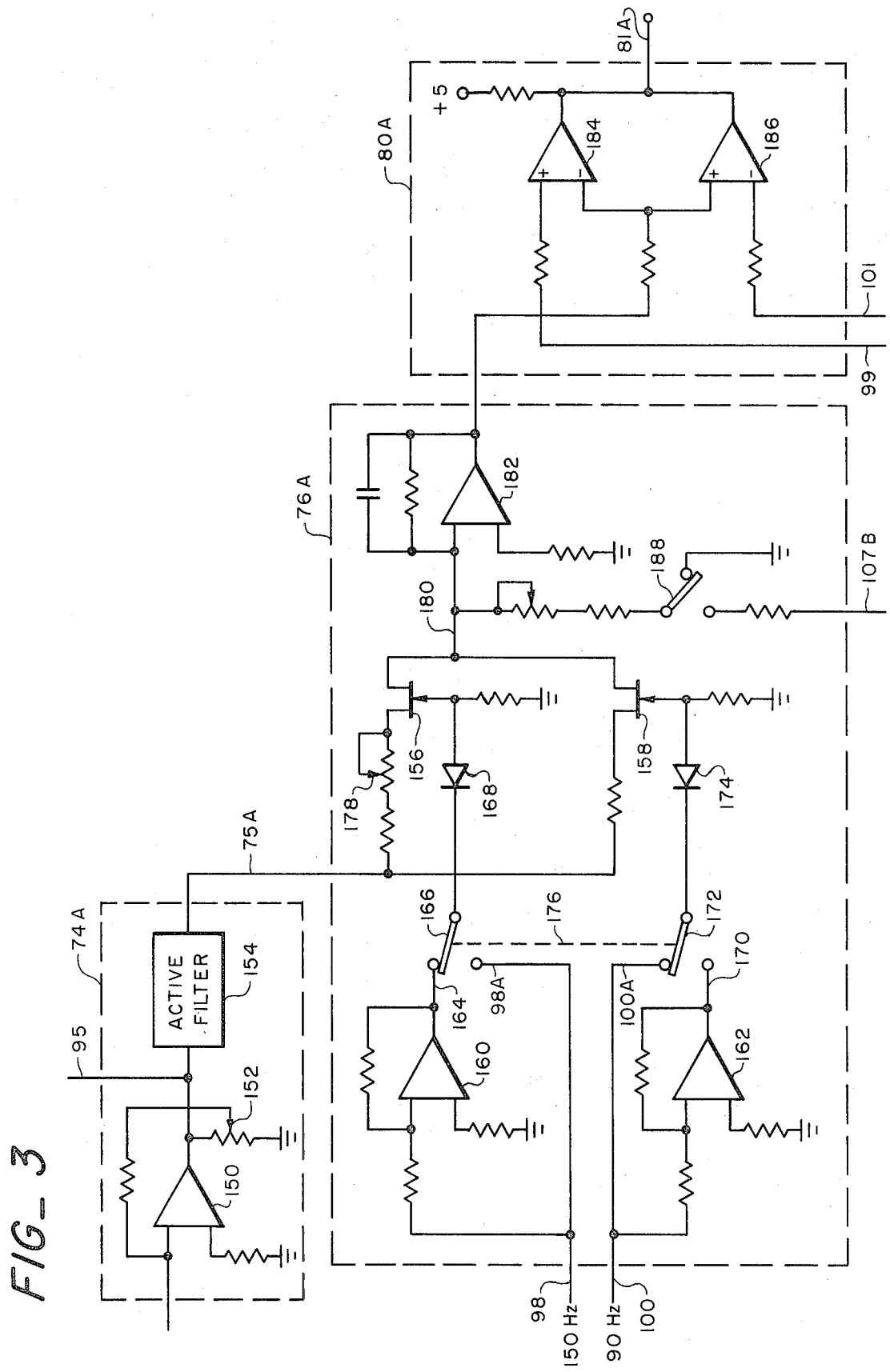
FIG_3

FIG_4
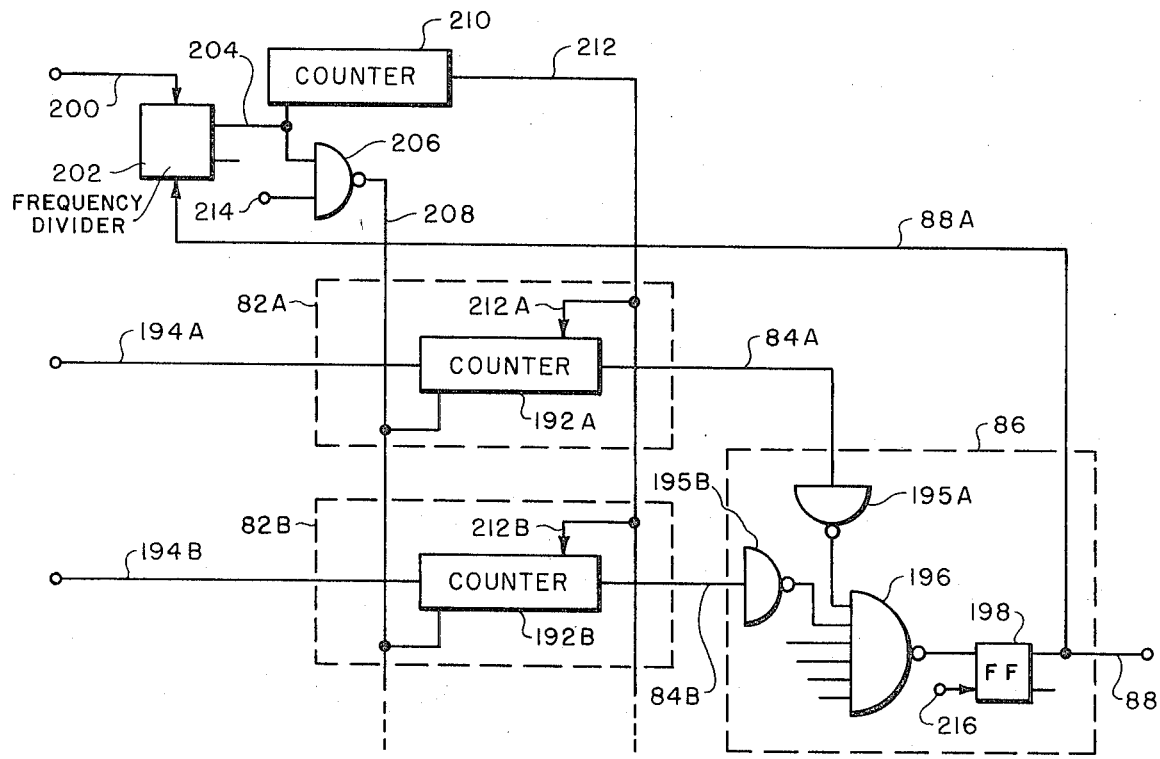
FIG_5
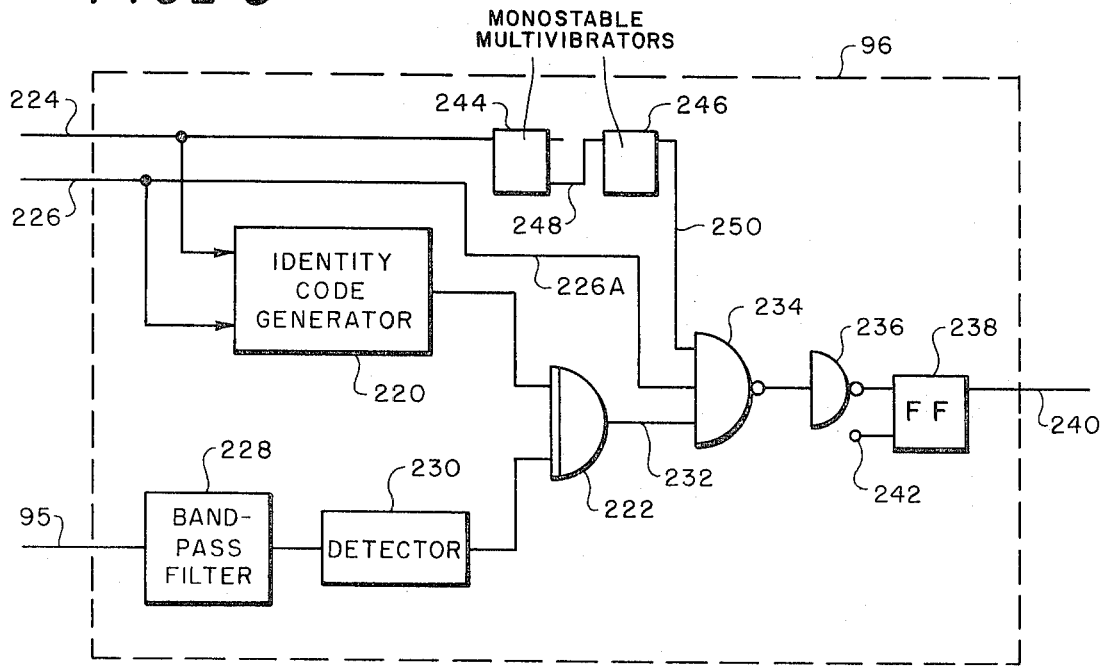

NAVIGATION AID TRANSMITTER-MONITOR SYSTEM

This invention relates to a monitor system for a radio navigation aid transmitter and in one aspect of the invention, it relates to the combination of a radio navigation aid transmitter and a monitor for that transmitter.

It is extremely important that radio navigational aids, such as the aids for aircraft commonly referred to as instrument landing systems (abbreviated "ILS") should operate within prescribed limits of accuracy so that the aircraft receiving the signals from the system will not be misled into a wrong path. Accordingly, it is vital that the output signals from such a system must be continuously monitored, and the system must be shut down if out-of-limits conditions are detected.

Accordingly, it is one object of the present invention to provide an improved monitoring system for a radio navigation aid transmitter.

It is another object of the present invention to provide an improved monitor system for a radio navigation aid transmitter including a plurality of monitor receiver antennas and including a complete separate receiver channel operable to process and check the signals received from each antenna element. A separate determination is made for the signal from each channel as to whether or not an out-of-limits condition exists indicating a malfunction of the transmitter.

It has been proposed to provide radio navigation aid transmitters of the type which define a specific navigation plane in space by means of a scanning beam. For instance, see the copending patent application Ser. No. 104,668 filed on Jan. 7, 1971 by Donald J. Toman and Lloyd J. Perper, now issued as U.S. Pat. No. 3,774,214, for a SCANNING BEAM GUIDANCE METHOD AND SYSTEM which is assigned to the same assignee as the present application. In a specific form of the system disclosed in that patent application, the scanning beam is provided by switching signals from one transmitter antenna element to another, thus providing different beam segments from each transmitter antenna element, the beam segments together providing a composite signal pattern. Such a scanning beam transmitter pattern, and particularly a switched scanning beam pattern, are very advantageously monitored by means of a plurality of monitor receiver antennas.

Accordingly, it is another object of the present invention to provide a monitor system which is particularly effective with scanning beam radio navigational aid transmitters, and particularly with switched scanning beam transmitters, and which is effective to detect aberrations and malfunctions of individual components or beam segments of the scanning beam.

It is another object of the invention to provide an improved monitor system for radio navigational aid transmitters embodying a new and improved method and apparatus for monitoring the depth of modulation of the carrier independently of variations of transmitter power output.

It is another object of the invention to provide an improved radio navigation aid transmitter monitor system which is simplified and which is made more accurate by providing timing signals to the monitor system directly from the navigation aid transmitter.

Further objects and advantages of the invention will be apparent from the following description and the accompanying drawings.

In carrying out the invention there is provided a monitor system for a radio navigation aid transmitter of the kind which transmits radio signals in a pattern defining a course plane in space, said monitor system including a plurality of separate monitor receiver antennas arranged at different displacement positions in space with respect to the course plane to monitor the signal pattern at each of said positions. A separate monitor receiver channel is provided and connected to each of said monitor receiver antennas for separately determining for each monitor receiver antenna the presence of deviations of the received signals from values within predetermined limits.

IN THE ACCOMPANYING DRAWINGS:

FIG. 2 is a detailed schematic circuit diagram of a signal reference level circuit, and associated circuits, employed in the system of FIG. 1.

FIG. 3 is a detailed schematic circuit diagram of circuit components for one receiver channel of the system of FIG. 1, and including a variable gain ampfier and filter, a synchronous detector circuit, and a signal voltage reference level comparison circuit.

FIG. 4 is a detailed schematic circuit diagram illustrating the digital persistence circuits, and the shutdown circuit which comprise a part of the system of FIG. 1.

Figure 1:
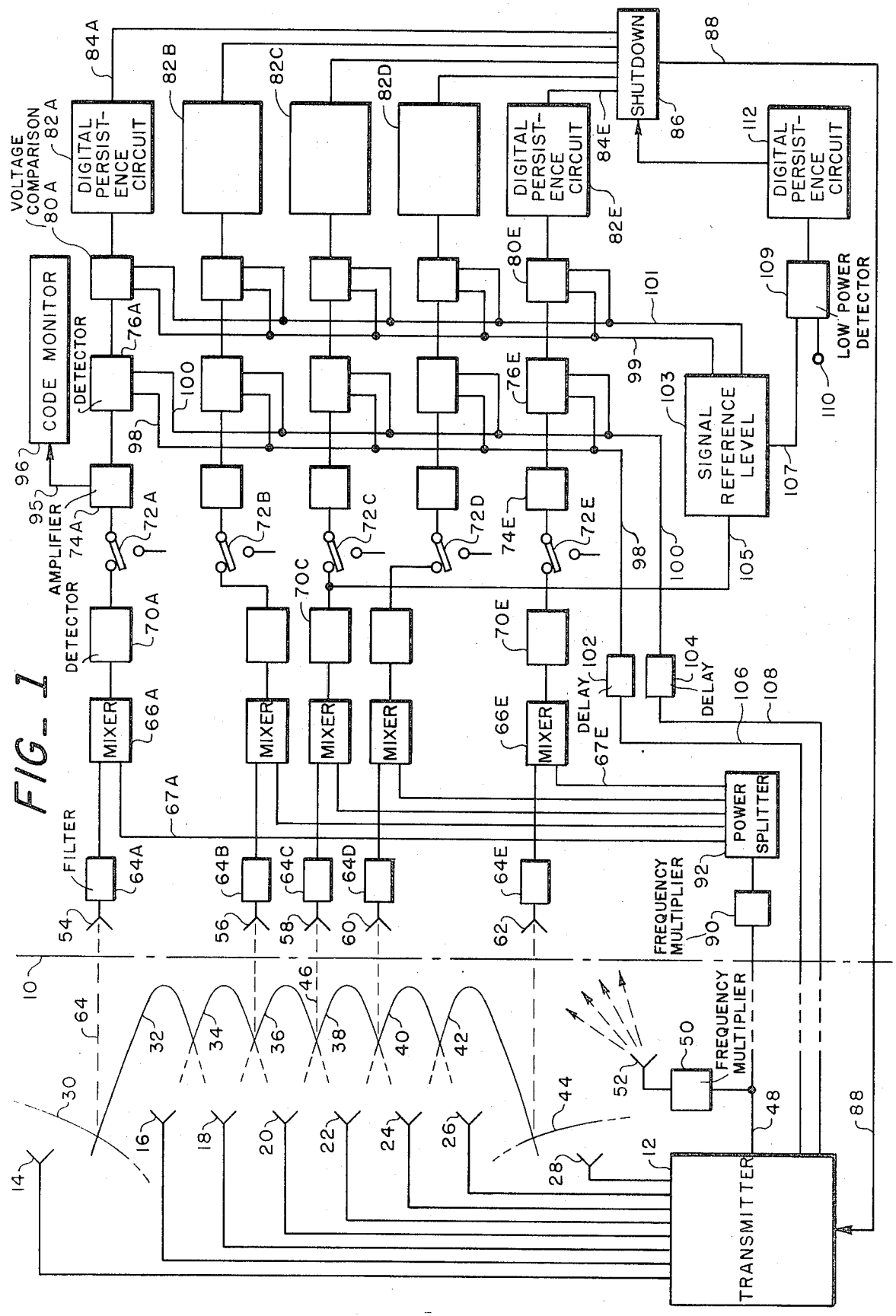
FIG. 1 is a schematic circuit diagram of a transmitter and monitor system in accordance with the present invention.

And FIG. 5 is a schematic circuit diagram of the code monitor circuit of the system of FIG. 1.

Referring more particularly to FIG. 1 of the drawings, the entire transmitter system which is being monitored is represented to the left of the dotted line 10, and the monitor system is represented to the right of line 10. The present invention is sometimes contemplated herein as comprising only the monitor, and in another aspect of the invention, it is regarded as comprising the combination of the transmitter and the monitor.

While a particular transmitter and antenna arrangement is disclosed in combination with the monitor, and while the monitor is particularly useful for monitoring a transmitter having the particular characteristics described, it will be understood that the monitor system can be employed with other transmitters having other characteristics.

The transmitter system includes a transmitter 12 connected to supply navigation signals to an array of eight separate navigation signal antenna elements 14–28. These antenna elements 14–28 (sometimes referred to below simply as antennas) are schematically positioned to correlate with their separate contributions to a combined signal pattern which is radiated by the combination of antenna elements. Thus, the end antenna elements 14 and 28 are effective to set up clearance beam radiations as schematically illustrated by partial beam curves respectively shown at 30 and 44. Similarly, the radiating element 16 provides a beam of radiation indicated at 32, and each of the other elements 18 through 26 provide a similar evenly spaced beam, the invidual beams being indicated by the curves 32–42. The antennas 14–28, and the associated beams 30–44 are symmetrically arranged on opposite sides of a course plane in space indicated by the dotted line 46. This is the navigational course plane defined by the transmitter. The radio signals radiated from all of the antenna elements 14–28 are at the same carrier frequency. However, the navigation plane 46 is defined by providing different proportions of modulating frequency tones at 90 and 150 Hz in the respective beams on opposite sides of the plane 46. Thus, the 150 Hz modulation predominates in the beams 36, 34, 32, and 30, and the 90 Hz modulation predominates in the beams 38, 40, 42, and 44.

The transmitter antenna configuration, and the radiation pattern, illustrated in the drawing are intended for use as a localizer system. This is a system which determines a vertical navigation 46 for guidance of a craft, such as an aircraft, in azimuth. Thus, if an aircraft is approaching the transmitter, it receives guidance signals which are balanced when it is in the navigation plane, and which direct it to turn left or right to achieve a course in the guidance path if it is not in that plane. A similar, but separate, system may be provided for the transmitter and the monitor for defining a glide-slope navigation plane to control elevation.

The arrangement of the antennas 14–28 and the beams 30–44 in this drawing are schematic representations only. The actual radiation beams are directed radially outwardly in a fan configuration, rather than in a parallel beam configuration as illustrated. The separations of the beams 30–44 in the vertical dimension in this drawing are representative of angular separations of the beams in the actual radiation pattern. For instance, typical angular separations between adjacent beams in the central group of beams 32–42 may be 3.6 degrees. The clearance beams 30 and 44 are of reduced peak energy level, and at wide angles in order to provide a "capture" signal for approaching aircraft and to cover side lobes of the more central beams. The center line of each of these beams may be at an angle in the order of 24 degrees from the guidance plane 46. The antenna elements 14–28 form an array which may employ common antenna structures, such as reflectors, which are not illustrated in the drawing.

The transmitter 12 and associated apparatus is preferably constructed in accordance with the teachings of the following prior patent applications which are assigned to the same assignee as the present application: patent application Ser. No. 104,668 filed on Jan. 7, 1971 by Donald J. Toman and Lloyd J. Perper, now issued as U.S. Pat. No. 3,774,214 for SCANNING BEAM GUIDANCE METHOD AND SYSTEM, and Patent No. 3,793,597 issued Feb. 19, 1974 to Donald J. Toman for a MODULATION SYNTHESIS METHOD AND APPARATUS. In accordance with the teachings of those patent applications, the transmitter is a switched scanning beam system in which the radiated radio frequency energy is switched in rapid sequence from one beam to another.

In accordance with the teachings of the above-mentioned prior patent application Ser. No. 104,668, the transmitter system radiates a standard frequency signal which is employed in the aircraft receivers to stabilize a local receiver oscillator. For this purpose, the transmitter 12 includes a standard frequency oscillator which supplies a standard radio frequency signal through a connector 48 and a frequency multiplier 50 to a separate antenna element 52. The frequency multiplier 50 actually constitutes a part of the transmitter 12, but is shown separately to clarify the explanation of the structure and operation of the monitor system which follows below. The standard frequency signal radiated from the antenna element 52 serves as a fixed frequency standard which is recognized by the receiver in the vehicle which is being guided to control and stabilize the oscillator in the receiver. The use of a fixed standard frequency signal for this purpose is taught in a prior copending patent application Ser. No. 54,510 filed on July 13, 1970 by Donald J. Toman now issued as U.S. Pat. No. 3,715,757 for a SYSTEM FOR GUIDANCE and assigned to the same assignee as the present application. While the shape of the beam from the standard frequency antenna 52 is not illustrated, it is understood to be a wide beam which encompasses the entire field of the beams 30–44.

The monitor of the present invention represents, in effect, a plurality of separate receiver channels, each channel having an antenna which is preferably precisely positioned in the field of the pattern of beams 30–44 from the transmitter. If there is an indication of any substantial out-of-limits condition in any one of the monitor receiver channels, then the transmitter 12 is shut down so that no aircraft will be misled by incorrect navigation information. There are preferably at least three separate monitor antennas and receiver channels, and in the preferred form illustrated in the drawing, there are five channels commencing respectively with receiver antennas 54–62. As indicated in the drawing, these antennas are preferably strategically located with respect to the various transmitter beams 30–44 to detect any serious failure or fault in the radiated energy. The center antenna 58 is positioned at the center of the navigation plane 46 defined by the radiation field. Thus, if the signals from the transmitter are correct, the signals received by antenna 58 should contain equal depths of modulation by the 150 Hz and 90 Hz modulation signal tones. The difference in depth of modulation should be zero. Most important in influencing this central signal are the beams 36 and 38 from the central transmitter antennas 20 and 22 which contain mirror image depths of modulation by the 150 and 90 Hz signals. Thus, in the preferred embodiment, the beam 36 includes more 150 Hz modulation and less 90 Hz modulation, and the beam 38 includes more 90 Hz modulation and less 150 Hz modulation. If either of the transmitter antenna elements 20 or 22 become inoperative, or fail to deliver a full power signal, this condition will be detected by the antenna 58 and the associated receiver channel.

In a similar fashion, the monitor antenna 54 is positioned at an angle, indicated by the dotted line 64, corresponding to the crossover point between the beams 30 and 32. The significance of this crossover point is that the energy level contributions of the two beams 30 and 32 are equal at this angle. Accordingly, if there is a significant change in power level radiation from either of the antenna elements 14 or 16, such a change is immediately detected by the antenna 54 and the associated receiver channel. In a similar fashion, the antenna 56 monitors the balance between the beams 34 and 36, the antenna 60 monitors the balance between the beams 38 and 40, and the antenna 62 monitors the balance between the beams 42 and 44. Thus, positioning the monitor antennas at equal radiation energy angles between the separate transmitted beams provides a very accurate and precise method for monitoring all of the separate component beams of the radiation pattern. Since each receiver channel monitors the balance between two adjacent beams, it is not necessary to provide a separate monitor channel at the equal energy point between beams 32 and 34, and at the equal energy point between the beams 40 and 42. Therefore, it is necessary to provide only half as many monitor channels as there are transmitter radiation beams. However, because the navigation plane 46 is so vital, and the beams 36 and 38 so important, a center monitor receiver antenna 58 is provided with its own separate receiver channel.

Each monitor receiver channel is effective to continuously check for the proper difference in depth of modulation between the 150 Hz and 90 Hz modulation signals expected at the particular location of the antenna for that channel. Thus, the channel connected to antenna 54 always expects to see much more 150 Hz signal than 90 Hz signal and the correct difference in depth of modulation must be detected to reflect that predominance of the 150 Hz signal. Similarly, the channel connected to antenna 62 expects to see predominance of the 90 Hz modulation. Since the mix of modulating signals is separately checked for each of the different points in the transmitter signal pattern represented by the different monitor antennas 54–62, it may truly be said that the system monitors the shape of the signal pattern.

The receiver channel connected to the antenna 54 can be briefly described as follows. It includes first a pre-selector filter 64A, a mixer 66A, an amplifier detector circuit 70A, a monitor integrity check switch 72A, a variable gain amplifier and filter circuit 74A, a synchronous detector 76A, a signal voltage reference level comparison circuit 80A, a digital persistence circuit 82A to determine whether or not an out-of-limits condition continues fo a period long enough to be regarded as dangerous, and a connection 84A to a shut-down circuit 86. The shut-down circuit 86 is common to all of the monitor receiver channels, and includes an operative connection, as indicated at 88, back to the transmitter 12 to shut down the transmitter 12 under a persistent out-of-limits condition detected by any of the monitor receiver channels.

Since the system compares the power levels in the different monitor receiver channels, and since those channels monitor different portions of the signal pattern related to the positions of the respective antennas 54–62 to which the channels are connected, it may be said that the system monitors the shape of the signal pattern in terms of the pattern of the signal strength of the carrier as detected at the different monitor antenna positions.

The separate receiver channels respectively connected to the remaining monitor antenna elements 56, 58, 60, and 62 are substantially the same as the receiver channel components 64A-82A just described which are associated with monitor antenna 54. In the other channels, the corresponding elements are given the same numbers, but with different letter suffixes. The suffix letters B, C, D, and E are employed for the receiver channel elements respectively associated with the monitor antenna elements 56, 58, 60, and 62. However, in order to promote clarity in the drawing, the lettering is omitted from most of the receiver channel elements, except for the receiver channels associated with the antennas 54 and 62, and respectively employing the suffix letters A and E.

The monitor receiver channel associated with the first antenna 54 will now be described in more detail. These detailed explanations will equally apply to all of the receiver channels, and to each of the corresponding components. The filter 64A may be referred to as a pre-selector filter, and is a band-pass filter employed to give protection against out-of-band interfering signals which may be picked up by the antenna 54. For instance, in one preferred embodiment of the invention, the apparatus is designed to operate at microwave frequencies in the C band, and particularly in that portion of the C band which is allocated for navigation signals from 5,000 to 5,250 MHz. The system is likely to be subjected to substantial interference signals such as, for instance, certain airborne weather radar systems which operate at about 5,400 megacycles. Accordingly, the filter 64A is a band pass filter for the radio frequency carrier of the transmitter 12 which excludes such interference signals.

The mixer 66A is provided to heterodyne the C band signals to a lower intermediate frequency. For this purpose, a local oscillator frequency is supplied to the mixer 66A through a connection 67A which is actually derived from the transmitter 12. The transmitter 12 standard frequency is supplied from connection 48 to a frequency multiplier amplifier 90 and then to a power splitter circuit 92, and thus to the connection 67A, and to the corresponding connections of the mixers for the other receiver channels. In a preferred embodiment of the invention, the multipliers 50 and 90 both multiply by exactly the same factor so that the local oscillator frequency supplied from the power splitter 92 to the mixer 66A corresponds exactly in frequency to the frequency standard signal emitted from the transmitter antenna element 52. This frequency standard signal is very close, in frequency, to that of the basic carrier signal used for the radiation of the navigation beams 30–44. In a preferred embodiment, the offset frequency between the two is in the range from about one to five MHz. Accordingly, the mixer 66A converts the signals to an intermediate frequency corresponding to the offset frequency in the range from one to five MHz. This arrangement of using the standard frequency radiated from antenna element 52 as a local oscillator frequency which is subtracted from the signals in the receiver channels completely eliminates the problem of interference from frequency standard signals which are received by the respective monitor receiver antennas 54–62. Those signals appear at the same frequency in the mixer 66A as the signals which are received through the power splitter 92. Thus, the frequency standard signals from the receiver antennas are eliminated from the outputs of the mixers in the same manner and by the same means as the "local oscillator" signals from the power splitter 92 in the normal course of detection and filtering. The frequency standard signals must be eliminated, for they would otherwise appear to the monitor receivers as additional navigation signals. This arrangement is very efficient in accomplishing that elimination because it combines this function in the inherent operation of the mixer-detector circuits.

The reason for providing separate multipliers 50 and 90 for deriving the frequency standard signal separately at the transmitter and at the receivers is because there is a substantial physical distance from the transmitter 12 to the monitor receivers. The lower frequency at the connection 48 can be transmitted much more efficiently over the distance to the multiplier 90 and the power splitter 92 which are located physically near the various monitor receiver channels.

The system does not directly monitor the frequency standard signals radiated from the antenna element 52. However, if there is a failure of the transmitter 12 to emit the lower frequency signals at connection 48 from which the standard frequency signals are derived, then there is no local oscillator frequency available through the circuits 90 and 92 to the mixers 66A–66E, and all of the monitor channels will indicate a loss of signal. Thus, the frequency standard signals are indirectly monitored, from a practical standpoint. If there is a failure in the transmitter system between the standard frequency connection 48 and the antenna element 52 such that no frequency standard signals are radiated, the airborne receivers will not operate to provide navigation signal indications, and thus, erroneous information is not imparted to the users.

As previously indicated, the usable intermediate frequency signals from the mixer 66A, after subtraction of the standard frequency, are in the sub-band range from one to five MHz. This band of frequencies is filtered and amplified in amplifier detector circuit 70A. Circuit 70A also includes a detector for demodulation. The demodulated signal then passes through the monitor integrity check switch 72A, which is normally closed in the position illustrated, to the variable gain amplifier and filter circuit 74A. The gain of the amplifier included in this circuit 74A can be adjusted in order to balance the various monitor receiver channels and to compensate for signal level differences to achieve the required channel operation.

The amplified signal is provided from circuit 74A through a connection 95 to a code monitor circuit 96 which determines whether a station identification code emitted by the transmitter 12, along with the navigation signals, is present, is correct and is accurate. The filter included within the circuit 74A is a low pass filter having an upper cut-off frequency at about 300 Hz. As previously mentioned, the transmitter 12 may preferably be a scanning beam type of transmitter, and the rate of scan may be in the order of 600 Hz. Accordingly, the filter within circuit 74A serves to eliminate any transmission of scan rate signals. The resultant signals are supplied to the synchronous detector 76A. Detector 76A includes solid state switching devices such as field effect transistors, which are gated on and off for very brief time spans synchronized with the positive and negative voltage peaks of the respective 90 and 150 Hz signal frequencies. These gating signals are provided through connections 98 and 100 obtained through time delay circuits 102 and 104, and connections 106 and 108 from the transmitter 12. These 90 and 150 Hz signals are the basic modulation signal frequencies which exist within the transmitter 12. The reason for the time delay circuits 102 and 104 is to compensate for the delays encountered in the individual receiver channels, chiefly in the filters such as the filter included in the circuit 74A.

This method of detecting the 90 and 150 Hz signals avoids the need for expensive narrow band pass filter devices for the respective 90 and 150 Hz signals, and it avoids the signal errors encountered in such devices. Furthermore, by detecting the positive loops of one signal, such as the 150 Hz signal, and by concurrently detecting the negative loops of the other signal, such as the 90 Hz signal the two resultant d.c. signals can be combined at the output of circuit 76A to directly provide a dc level signal which is a measure of the difference in depth of modulation (sometimes simply referred to as "DDM"). That is, the dc level of the output from the synchronous detector indicates the relative proportions of 150 Hz positive loop amplitude to 90 Hz negative loop amplitude. This DDM signal is compared in a signal voltage reference level comparison circuit 80A to determine whether the difference in depth of modulation signal is within the desired limits indicating proper operation of that portion of the transmitter being monitored by this particular receiver channel. The voltage reference level signals which determined upper and lower voltage limits for the voltage comparison in voltage comparison circuit 80A are provided through connections 99 and 101 from a signal reference level circuit 103. The signal reference level circuit 103 derives the voltage reference level limit voltages as a function of the strength of the carrier signal on the center channel as detected from a connection to the center channel indicated at 105.

If the voltage comparison circuit 80A detects an out-of-limits condition, it provides an output signal to the digital persistance circuit 82A. If the condition persists for a period which is long enough to cause a serious navigation error to an aircraft being guided, then the digital persistence circuit provides a signal through connection 84A to the shut-down circuit 86 which, through connection 88, causes the transmitter 12 to be shut down and turned off.

The signal reference level circuit 103 responds to the amplitude of the carrier as received by the center channel antenna 58 by means of the connection 105 to receive the detected D.C. voltage envelope derived from the carrier signal. This method of deriving signal reference levels has the major virtue that the monitor system is self-adjusting for normal variations in the radio frequency output level from the transmitter due to variations in conditions such as operating temperatures. Such variations in output power affect the transmitter in a uniform manner so that the power from all of the transmitter antenna elements is either reduced or increased in response to the operating conditions. The variation of the power output not only causes a variation in the radio carrier signal, but also a proportional variation in the signals carried by the carrier modulation. Thus, the depth of modulation signals detected by the synchronous detector 76A are not corrected for variations in the output power level. However, by setting reference level limit voltages for the depth of modulation signals based on the strength of the carrier signal, a power level correction is effectively added. Thus, depth of modulation is checked in an absolute sense, independent of variations in output power level. This permits precision monitoring of the depth of modulation (including the difference in depth of modulation) by setting narrow limits for the voltage reference level comparison circuits such as circuit 80A.

While this signal reference level arrangement depends upon the radio frequency carrier signal strength on only one channel of the monitor, it is nevertheless a fail-safe system because, if that channel of the monitor should fail, or if the output should deteriorate significantly, the resultant apparent signal reference level voltages supplied from circuit 102 to the comparison circuits for the individual channels, such as 80A–80E, will indicate an out-of-limits condition and shut down the transmitter. Furthermore, using a signal reference level derived from the carrier from one monitor channel to set voltage limits for measurement of the depth of modulation of the signals of a second monitor channel provides a very significant advantage in that the overall strength of the signals in the second monitor channel are being checked along with the depth of modulation. This means that the power level of the second channel is being checked against the power level of the first channel. This is particularly important when monitoring switched scanning beam systems of the type disclosed in FIG. 1, for it provides a reliable indication of any outright failure, or substantial attenuation, of the signal radiated from a beam position being monitored by either of the two monitor receiver channels. Accordingly, this arrangement not only checks the depth of modulation independent of the power level, but it also compares the power levels in different monitor receiver channels.

If the overall power of the transmitter falls to a level which is to low to be satisfactory, that condition is detected at a connection 107 from the signal reference level circuit 103 to a low power detection circuit 109. In circuit 109, a voltage comparison is made with a standard voltage source (not shown) connected to terminal 110. If the low power condition is detected, the low power detection circuit 109 provides a resultant signal to a digital persistence circuit 112. If the out-of-limits condition persists beyond the interval for which the persistence circuit 112 is set, then it provides a shut-down signal to the shut-down circuit 86 to turn off the transmitter 12.

FIG. 2 shows the signal reference level circuit 103 and the low power detection circuit 109 in greater detail. The circuit 103 includes two operational amplifiers 114 and 116 connected in cascade, the amplifier 116 having a variable gain adjustment feedback circuit through a potentiometer 118 to set the desired D.C. reference level voltage value for usual, or normal operating conditions of the system at the output line 107. In one preferred form of the invention, this voltage may be at a normal −5 volts at the output connection 107 of amplifier 116.

The power level signal voltage at connection 107 is supplied to a voltage divider potentiometer 134 to pick off a power level error limit voltage as a fixed increment of the power level signal. In a preferred embodiment of this invention, this error limit voltage may be in the order of 20 percent of the power level signal voltage at connection 107. The error limit voltage from potentiometer 134 is inverted in an inverting amplifier 136, and the inverted value at the output of amplifier 136 is added through resistor 138 with the power level signal voltage from connection 107A supplied through a resistor 140 at the input of an amplifier 142. This addition of the inverted value of the error limit voltage to the power level signal voltage accomplishes an effective subtraction of the error limit voltage from the power level signal voltage. Thus, the output of amplifier 142 at connection 101 provides the low level of reference voltage which is below the power level signal voltage by the amount of the error limit voltage. In a preferred embodiment of the invention, under typical operating conditions, this lower limit may be in the order of four volts dc.

The error limit voltage from potentiometer 134 is also directly added at resistor 144 to the power level signal voltage at resistor 146 in the operational amplifier 148 to provide the upper signal reference level at connection 98. In the preferred embodiment, and typical operating conditions, this voltage may be in the order of six volts. One of the major advantages of the arrangement of the circuit is that the power level error limit voltage is easily and conveniently adjusted at the potentiometer 134, and this adjustment has the effect of widening or narrowing the voltage limits in a symmetrical fashion above and below the power level signal voltage available at connection 107.

The voltage level at 107 indicating the power level of the carrier received on the third channel, is also supplied through the connection 107 to the low power detection circuit 109 where it is supplied as one of the inputs to a differential amplifier 122. The other input to the differential amplifier 122 is a standard reference level voltage applied at terminal 110 from a reference voltage circuit including an operational amplifier 124 and including a zener diode 126 as a device which determines a precise reference voltage. The zener diode 126 is provided with an unregulated positive dc voltage at terminal 128 from a source which is not shown. The precise voltage supplied by the reference circuit at connection 110 is determined as a fraction of the zener diode 126 voltage by an adjustable voltage gain feedback connection on the operational amplifier 124 from potentiometer 130.

In the low power detection circuit 109, the operational amplifier 122 is connected to another zener diode 132 which determines a threshold difference voltage which must be exceeded in order to provide an output to the persistence circuit 112 indicating the low power condition. By adjustment of the potentiometer 130, the voltage at connection 110 can be adjusted. This provides for a determination of the power level signal on connection 107 at which a low power condition is to be detected by the comparison circuit 122.

The basic power level signal at connection 107 is also available to the remainder of the system at a branch connection circuit 107B. In a preferred embodiment of the signal reference level circuit 103, and the associated voltage comparison circuits 80A–80E, there is the capacity for accommodating for variations in power output over a range as great as ten to one. However, as a practical matter, a ratio no greater than one to four is believed to be practical, and it is anticipated that the low power output circuit 109 is usually adjusted to cause the detection of a lower power failure if the power drops below a value which is about one-quarter of the maximum anticipated power output.

FIG. 3 is a more detailed schematic circuit diagram showing the variable gain amplifier and filter circuit 74A, the synchronous detector 76A, and the signal voltage reference level comparison circuit 80A previously described above. As illustrated in this figure, the amplifier within the circuit 74A may consist simply of an operational amplifier 150 having a variable voltage gain adjustment feedback connection through a potentiometer 152. Also included in the circuit 74A is a low pass filter 154, which is preferably an active filter incorporating operational amplifiers. The output signal from filter 154 is supplied through a connection 75A to the synchronous detector circuit 76A. The output from amplifier 150 is available on a branch circuit 95 to a code monitor circuit 96 shown in FIG. 1 and described more fully below. The basic elements of the circuit 76A are gating devices 156 and 158 which may consist of field effect transistors. Devices 156 and 158 are respectively gated on and off synchronously with 150 and 90 Hz signals provided from connections 98 and 100 respectively. These basic timing signals are provided in both inverted and non-inverted form with the aid of inverter amplifiers 160 and 162. Thus, the inverted 150 Hz wave is supplied at the output of the inverter amplifier 160 at a connection 164 to the upper contact of a switching arrangement schematically illustrated as a switch lever 166. The lower contact of the switch 166 is connected to receive the uninverted 150 Hz signal at connection 98A. Thus, depending upon the position of switch 166, the inverted, or the directed uninverted 150 Hz switching signal wave can be supplied from the switch 166 through a diode 168 to the control electrode of the field effect transistor 156 to gate that transistor on and off. Similarly, the direct and inverted 90 Hz switching waves are supplied at connections 100A and 170 to a similar switch lever 172. From the switch lever 172, the 90 Hz wave is supplied through a diode 174 to the control electrode of the field effect transistor 158 to gate that transistor on and off to detect the 90 Hz component of the incoming signal. The switch levers 166 and 172 are ganged together, as indicated at 176, so that the inverted form of one of the frequencies, and the non-inverted form of the other of the frequencies are connected through to the switching devices 156 and 158. This is done so that the synchronous detection of the two frequencies will result in net contributions to the dc level of the output signal which are in opposite senses for the two frequency components in the incoming signal. A fine balance in the symmetry of the operation of the discriminator circuit is obtainable by a variable trimming resistance 178 in the input circuit to the transistor 156.

The combined outputs from the field effect transistors 156 and 158 appear at the common connection 180, and are thus supplied to the input of a low pass filter and inverting amplifier 182. The output from the inverting amplifier 182 is supplied to the comparison circuit 80A where it is connected to the common inputs of amplifiers 184 and 186. The signal reference level voltages generated by the reference level circuit previously described in connection with FIG. 2 are supplied on connections 99 and 101 respectively to the upper input of amplifier 184 and the lower input of amplifier 186. The amplifiers 184 and 186 operate as a voltage comparator circuit to determine whether the D.C. level of the output from the amplifier 182 is within the voltage reference level limits on the connections 99 and 101. If the signal is outside these limits, a resultant signal appears at the output connection 81A from the comparison circuit 80A.

Referring again to the synchronous detection circuit 76A, it will be understood that the switch levers 166 and 172 are only schematic representations of functional switches in the circuit, and the functions of these switches may be provided instead by electronic switching elements. Furthermore, because of the inherent characteristics of field effect transistors, for correct and accurate operation of the field effect transistors 156 and 158, each of these transistors preferably has a second field effect transistor shunting it from its input circuit to ground, and connected to be triggered by an input signal (such as the 150 Hz or 90 Hz signal) in an opposite phase. However, in order to promote simplicity and clarity in the drawings, these shunt connected field effect transistors are omitted in the drawings.

While the circuits of FIG. 3, are described as portions of the first receiver channel which obtains its signal from the antenna 54 of FIG. 1, substantially identical circuits are employed in the corresponding portions of each of the other receiver channels. Under typical operating conditions, with the receiver channel operating correctly, the dc output voltage level from the amplifier 182 of synchronous detector 76A to the comparison circuit 80A should be at a value which is substantially mid-way between the limit voltages on connections 99 and 101. In the preferred embodiment of this invention, that voltage may typically be about five volts positive, and the limit voltages on connections 99 and 101 may be respectively six volts positive and four volts positive. In order to achieve this typical five volt output value from amplifier 182, the voltage gain of the entire circuit may be adjusted by adjusting the potentiometer 152 to thereby adjust the gain of the amplifier 150 within the circuit 74A.

As previously explained in connection with FIG. 1, there will be various mixtures of 150 Hz and 90 Hz signals received at the different monitor receiver antennas. For instance, in the first channel connected to antenna 54, the 150 Hz signal will predominate, and the 90 Hz signal will be relatively very weak. Thus, the difference in depth of modulation signal supplied at the output of amplifier 182 will consist almost entirely of a measurement of the actual depth of modulation of the 150 Hz signal, with very little subtraction for the presence of the minor amount of 90 Hz signal. Therefore, the difference is basically greater than it would be for one of the more centrally located monitor receivers. However, in order to make use of the standardized signal reference level voltages on connections 99 and 101, the gain of the amplifier 150 is simply reduced by adjustment of the potentiometer 152 to bring the expected output of the difference in depth of modulation signal from amplifier 182 to the vicinity of the midpoint voltage, typically five volts.

Since the final amplifier 182 within the synchronous detector circuit 76A inverts the signal supplied to it, the negative loops of the 150 Hz components of the input signals are detected by employing the inverted form of the 150 Hz timing signal supplied at connection 98 as determined by the position of switch 166 shown. Conversely, the non-inverted form of the 90 Hz signal at connection 100 is employed to trigger the field effect transistor 158 to detect the positive loops of the 90 Hz components. This same arrangement, and the same positions of the switches, are employed in the monitor receiver channel carrying the suffix letter B which is connected to the monitor antenna 56. However, a different adjustment of the gain determining potentiometer 152 is necessary since there is a different mix of 90 and 150 Hz signal components, there being a higher proportion of 90 Hz signal. For the receiver channels carrying the D and E letter suffixes the channels which are respectively supplied from the antennas 60 and 62, the connections are just the same except that the ganged switches 166 and 172 are reversed because these antennas receive a predominance of 90 Hz signals and the negative loops of the 90 Hz signals must be detected while the positive loops of the 150 Hz signals are detected before inversion in the final amplifier 182.

For the center monitor receiver channel connected to the center monitor antenna 58, and bearing the suffix letter C on its components, the 90 and 150 Hz signals should be perfectly balanced and the difference in depth of modulation (DDM) output signal from amplifier 182 would be expected to be zero. Accordingly, in order to provide an output which has a nominal value in the order of five volts which can be effectively compared in the comparison circuit 80A, an offset voltage is added to the input of amplifier 182 by means of a circuit including a switch 188, which may be shifted from the grounded position shown, to connect with an incoming voltage source connection 107B. This is the same 107B connection shown in FIG. 2 and carries the power level signal voltage from the signal reference level circuit 103, which has a nominal value of five volts. This offset voltage will vary up and down depending upon ambient operating conditions of the transmitter, as detected by the signal reference level voltage circuit 103, along with the reference level limit voltages on connections 99 and 101. Thus, the center channel will not be caused to detect an out-of-limits condition because of normal variations in transmitter output power levels. Accordingly, only actual malfunctions of the transmitter affecting the signals received by the center antenna will cause the detection of an out-of-limits condition. Such a malfunction may include an unsymmetrical signal pattern due to interruption or attenuation of signals from one of the transmitter antenna elements such as 20 or 22.

According to the above description, the synchronous detector 76A, and each of the corresponding synchronous detectors 76B–76E include separate inverter amplifiers 160 and 162. However, only one set of these inverter amplifiers need be provided for all five channels, since both the direct and inverted forms of the 90 Hz and 150 Hz timing waves can be wired from one source to all five receiver channels.

FIG. 4 is a schematic circuit diagram illustrating more details of the digital persistence circuits 82A and 82B, and the shut-down circuit 86 of FIG. 1. The remaining digital persistence circuits 82C–82E, and 112 are substantially identical to the circuits 82A and 82B, and are thus not separately illustrated.

The digital persistence circuit 82A consists essentially of a digital counter 192A which receives an enabling signal on a connection 194A from the comparison circuit 80A of FIG. 1. Thus, a deviation signal detected by the comparison circuit 80A of FIG. 1 is supplied as an enabling signal to counter 192A. During any interval when this enabling signal is available, the counter 192A counts upwardly. If the counter 192A counts high enough to be filled, it provides an error signal output on connection 84A to the shut-down circuit 86.

The counter 192A is reset at regular periodic intervals. Thus, the deviation signal (enabling signal) must persist for enough time between successive reset operations of the counter to permit the counter to fill to cause an output at 84A. It is for this reason that circuit 82A may be referred to as a persistence circuit. The signal at 84A is provided through an inverter 195A to a NAND gate 196 to "set" a shut-down flip-flop 198. Flip-flop 198 then provides a resultant output on connection 88 to turn off the transmitter which is being monitored.

The gate 196 is a multiple input NAND gate which provides a logic zero output in the presence of logic one inputs on all of its input connections. The output from inverter 195A is normally a logic one. But when the counter is full to provide a change in output to logic one at connection 84A indicating a deviation error signal, the output from inverter 195A goes to logic zero. The logic zero signal causes the NAND gate 196 to provide a logic one signal to set flip-flop 198 to provide an output on connection 88 to turn off the transmitter.

Clock pulses are supplied to a frequency divider flip-flop 202 from a basic clock source (not shown) connected to an input line 200. The divided frequency clock pulses are supplied from flip-flop 202 through a connection 204, a NAND gate 206, and a connection 208 to the counters 192A, 192B, etc. The divided frequency clock pulses are also supplied from the flip-flop 202 through connection 204 directly to a reset control counter 210. The counter 210 may also be referred to as a reference counter. Each time the reset control counter 210 achieves the full count condition, it emits a signal on an output connection 212 which is supplied through branch connections 212A and 212B to reset the counters 192A and 192B. The reset control counter 210 then immediately counts around to the zero count and recommences to count upwardly from that value. Accordingly, the reference counter 210 is continually counted upwardly to the filled condition and repeatedly and periodically emits the reset signal to the counters 192A and 192B. The counters 192A and 192B are not reset to zero, but are reset to some count value which gives them a shorter counting period to the filled condition than the reset control counter 210. Thus, if the counter enable signal on connection 194A to counter 192A persists for a total period long enough during the operation of the reference counter 210 cycle to permit the counter 192A to achieve a full count before the reference counter resets the counter 192A, then an error output will be provided on connection 84A causing a shutdown of the transmitter.

In a specific example, for instance, each of the counters 210, 192A, and 192B may be four stage binary digital counters capable of counting from 0 through 15. The counters 192A and 192B may be reset to a predetermined number. For instance, the number 5 may be selected. Accordingly, if a deviation signal on the enabling connection 194A is available to the counter 192A for more than two-thirds of any reset control counter 210 cycle interval after counter 192A has been last reset to a count of five, then the counter 192A will achieve a full count and emit an output signal on connection 84A before the reference counter 210 achieves a full count and resets the counter 192A to again reduce the count stored therein to the value 5.

In a preferred physical embodiment, the clock signals provided at the clock input terminal 200 are at 30 Hz. The frequency divider flip-flop 202 divides this frequency by two to provide a counter frequency at 15 Hz. This provides essentially a one second reference counter cycle since the reference counter 210 will be reset in successive intervals each having a duration of 16/15 of a second.

By selecting different numbers to be reset into the counters 192A and 192B, different deviation error intervals can be selected for the period during which the deviation signal must persist in order to activate the shut-down circuit 86. Thus, it is a very simple matter to increase or decrease the persistence period of deviation which is to cause actuation of the shut-down circuit 86. It is also contemplated that different initial reset numbers may be used for different circuit counters 192A, 192B, etc., to permit the selection of different deviation error persistence periods for different types of deviations. Thus, some deviations may be regarded as more critical and it may be desirable to permit such deviations to persist for a shorter period before causing shut down. A very simple method for uniformly increasing or decreasing the persistence periods of all of the persistence circuits is simply to change the clock frequency supplied at the connection 200. By increasing that frequency, the persistence periods are all reduced. Conversely, by decreasing the clock frequency, all of the persistence periods are increased.

The circuits 82A and 82B may be referred to as digital filter circuits because they operate essentially as low pass signal filters, permitting the passage of deviation error signals only when they have a persistence or periodicity which is low enough to permit the counter 192A, for instance, to fill before the reference counter 210 fills in any one reference counter operation cycle. While this is referred to as a filter, it would obviously be very difficult and expensive to provide a conventional inductance-capacitance filter having such a low cut-off frequency, in the order of one cycle per second, because of the expense and bulk of the components. Furthermore, such a conventional filter device would not be adjustable with such precision as are the digital filter circuits of this invention.

The NAND gate 206 is provided in the clock pulse circuit 204–208 to the counters 192A and 192B in order to inhibit the delivery of clock pulses to those counters during start-up conditions. This is accomplished by providing a disabling logic zero signal on the input connection 214 of gate 206 during start-up, and then providing an enabling logic one signal at terminal 214 at all other times. By inhibiting delivery of clock pulses to counters 192A and 192B momentarily on start-up, the reset control counter 210 is caused to reset the counters 192A and 192B at least once before regular operation begins. This avoids "false" shut-down signals under start-up transient conditions.

Whenever the circuit 86 provides the shut-down signal to the transmitter on the output connection 88, that same signal is provided through an auxiliary circuit 88A to an inhibit input connection to the frequency divider flip-flop 202 so as to stop the operation of that flip-flop and to thereby stop the delivery of clock pulses to all of the counters. This permits the operator of the system to read the counts in each of the counters 192A, 192B, etc. to determine which receiver channel, or other deviation detection channel, detected the deviation which persisted long enough to cause shutdown of the transmitter. This permits a more rapid diagnosis of the problem with the transmitter so that the difficulties can be remedied or repaired quickly. Whenever it is decided that the system should be reactivated for normal monitoring operation, and the transmitter again turned on, a reset signal is supplied at the shut-down circuit 86 to the flip-flop 198 at the flip-flop reset input connection 216. Flip-flop 198 is thus reset, and the shut-down signals are thus removed from connections 88 and 88B, and the clock pulses are again supplied through the frequency divider 202 to the counters 210, 192A, and 192B, etc.

FIG. 5 is a more detailed schematic circuit diagram of the identity code monitor 96 of FIG. 1. This code monitor includes its own identity code generator 220 which generates a code identical to the identity code sent out by the transmitter, and the two codes are compared in a comparison circuit 222 to determine whether or not the correct identity code is being transmitted by the transmitter. The identity code generator 220 is basicly a readonly digital memory which is supplied with timing signals on connections 224 and 226 which are wired directly from the transmitter being monitored. The signals on connection 226 are "message on" signals indicating the start and continuation of the interval during which the identity code message is being transmitted by the transmitter. The other timing signal on connection 224 is a basic clock rate timing signal. In one preferred physical embodiment, this clock rate is 7.5 Hz. Within this clock rate, a Morse code "dot" may be signified by a single clock period during which the signal is off followed by a single clock period during which the signal is on, while a dash is signified by a single clock period during which the signal is off followed by three clock periods during which the signal is on. With the aid of the timing signals on connections 224 and 226, the code generator 220 is caused to operate in synchronism with the transmitter code generator.

The identity code signals from the receiver appear on connection 95, and are detected by the combination of a band-pass filter 228 and a detector 230. In one preferred embodiment of the invention, the identity code signals are transmitted on a modulation frequency tone of 300 Hz, and accordingly the band-pass filter 228 is tuned to have a center frequency of 300 Hz. The comparison circuit 222 is simply an "exclusive OR" circuit which has the operating characteristic of providing an output signal at connection 232 only when the two inputs are different. Thus, if the inputs are both logic zero, or both logic one, there is no output (logic zero) at connection 232. This is the coincidence condition which indicates that the identity code transmitted by the transmitter is correct.

The identity condition is checked once during each cycle of the basic 7.5 Hz timing wave. This check takes place in the NAND gate 234, and if a lack of coincidence is detected, the resultant logic zero output signal is inverted by an inverter 236 and caused to set a flip-flop 238 providing an error output signal at connection 240. The error output signal may be used to shut down the transmitter, or to provide an alarm indicating an identity code transmission failure (or a failure of the identity code monitor 96). The identity code monitor can be reset to remove the output signal at terminal 240 by momentarily applying a reset signal at the reset terminal 242 of the flip-flop 238.

The sampling intervals during which the comparison signal at 232 is sampled by the NAND gate 234 are determined by timing signals obtained from the timing input signals on connections 224 and 226. The "message on" signal at connection 226 is supplied directly through the extension of that circuit 226A to the gate 234, so that the coincidence condition is tested only while the identity code message is on. The coincidence condition is tested only once during a very short interval at the midpoint of each timing cycle of the basic 7.5

Hz timing wave. This timing function may be accomplished in various ways. However, one preferred method is to provide two cascade-connected monostable multivibrators 224 and 246 connected to receive the basic timing signal from connection 224, and the deliver to gate 234 a very short duration test signal during each timing cycle. The monostable multivibrator circuits 244 and 246 are essentially flip-flop circuits which, when shifted to the set state by an incoming set signal, automatically reset after a predetermined period whether or not the set signal has terminated. In the present circuit, the delay provided by the monostable circuit 244 in resetting after it has received a set signal on the timing line 224 provides a delay in the delivery of the reset output therefrom on connection 248. This serves to delay the test signal to essentially the middle of the basic clock frequency interval. The signal on connection 248 then causes the monostable circuit 246 to be set, emitting a short duration test signal on connection 250 to gate 234, the test signal being terminated by the automatic resetting of the monostable circuit 246.

The NAND gate 234 has the characteristic of providing a logic zero output only in the presence of logic one inputs on all of its input connections. Thus, it is only when a lack of coincidence signal (logic one) appears on connection 232 in conjunction with a "message on" signal on connection 226A, and a basic timing signal on connection 250, that an identity code error can be detected.

By sampling and testing during only a very brief test period during each clock interval determined by the test signal on connection 250, a very adequate identity code check is possible without the necessity for absolute perfection in the phase coincidence between the transmitted identity code signal and the identity code monitor signals generated by the identity code generator 220. Furthermore, the system of the code monitor can be very economically constructed since code switching transients are avoided.

Referring again to FIG. 1, the switches 72A–72E may be employed for the purpose of checking the integrity of the monitor channels by switching signals into each channel which simulate out-of-limits signals to confirm that such out-of-limits signals do indeed cause the monitor to indicate an error condition. The switches 72A–72E are normally in the position illustrated to receive signals derived from those picked up by the respective antenna elements 54–62. However, when the simulated signals are to be used, the switches are shifted out of the position shown, to receive the simulated signals through the lower switch contacts. The simulated signals may be derived from signals which are directly wired from the transmitter 12. The signals may simulate, for instance, a complete loss of one of the beams which the particular channel is monitoring. Details of the circuits for deriving the simulated signals are not illustrated. While the switches 72A–72E may be switched individually, to separately check the integrity of each receiver channel, in a preferred form of the invention, the switches 72A–72E are ganged so that the integrity of all of the channels can be checked simultaneously. The circuit preferably includes means (not shown) for detecting individually that all of the channels have correctly indicated an error in response to the simulated signals. Furthermore, during reception of the simulated signals, the shut-down circuit 86 is inhibited to prevent actual shut-down of the transmitter 12. Thus, the integrity check can be accomplished very quickly, only momentarily interrupting the otherwise constant monitoring of the true outputs of the transmitter 12, and without removing the transmitter from service. Furthermore, the outputs of the transmitter are not modified in any way so that an aircraft using the navigational signals from the transmitter 12 during the integrity check interval is not misled or inconvenienced in any way.

The illustration of switches 72A–72E as mechanical switches is schematic only. These switch functions may be carried out with solid state electronic switching devices.

While this invention has been shown and described in connection with a particular preferred embodiment, it is apparent that various changes and modifications, in addition to those mentioned above, may be made by those skilled in the art without departing from the basic features of the invention. Accordingly, it is the applicants' intention to protect all variations and modifications within the true spirit and valid scope of this invention.

We claim:

1. A monitor system for a radio navigation aid transmitter of the kind which transmits radio signals in a pattern defining a course plane in space, said monitor system including at least three separate monitor receiver antennas arranged at different displacement positions in space with respect to the course plane to monitor the signal pattern at each of said positions, a plurality of monitor receiver channels equal in number to the number of said monitor receiver antennas, a separate one of said monitor receiver channels being connected to each of said monitor receiver antennas for separately determining for each monitor receiver antenna the presence of deviations of the received signals from values within predetermined limits allowable for the portion of the radio signal pattern monitored by that antenna, a signal reference level circuit for providing reference level signals for defining said predetermined limits for said received signals for all of said monitor receiver channels, said signal reference level circuit being connected to one of said monitor receiver channels and being operable to receive a signal from said last-mentioned monitor receiver channel proportional to the strength of the carrier signal received by that channel and operable to generate said reference level signals proportionally to said carrier signal.

2. A system as defined in claim 1 wherein said signal reference level circuit comprises an amplifying means connected to said one of said monitor receiver channels, said amplifying means being operable to amplify the detected carrier envelope to derive a D.C. voltage proportional to the carrier envelope as a power level voltage signal, a voltage dividing means connected to receive said power level voltage signal and operable to select a fraction of said power level voltage signal as a power level error limit voltage, means connected to add said power level error limit voltage to said power level voltage signal to derive a voltage sum to be used to provide an upper signal reference level voltage, and means for subtracting said power level error limit voltage from said power level voltage signal to derive a difference voltage to thereby provide a lower signal reference level voltage.

3. A system as claimed in claim 2 wherein said voltage dividing means is adjustable to provide an adjustment of the ratio of said power level error limit voltage to said power level voltage signal to thereby symmetrically adjust said upper signal reference level and said lower signal reference level voltages about the voltage value of said power level voltage signal to provide wider or narrower spreads between said upper and said lower signal reference voltage levels.

4. A monitor system as claimed in claim 1 wherein said signal reference level circuit comprises an amplifying means connected to said one of said monitor receiver channels, said amplifying means being operable to amplify the detected carrier envelope to derive a D.C. voltage proportional to the carrier envelope as a power level voltage signal, a calibrated standard D.C. voltage source, and means for comparing said power level voltage signal with the output of said standard D.C. voltage source to determine the existence of a low power level in said one of said monitor receiver channels.

5. A monitor system as claimed in claim 1 wherein there is provided a common shut-down control means connected to all of said monitor receiver channels and operable in response to a deviation of the signal from any one of said channels from values within said predetermined limits to shut down the transmitter.

6. A monitor system for a radio navigation aid transmitter of the kind which transmits radio signals in a pattern defining a course plane in space, said monitor system including a plurality of separate monitor receiver antennas arranged at different displacement positions in space with respect to the course plane to monitor the signal pattern at each of said positions, a plurality of monitor receiver channels equal in number to the number of said monitor receiver antennas, a separate one of said monitor receiver channels being connected to each of said monitor receiver antennas for separately determining for each monitor receiver antenna the presence of deviations of the received signals from values within predetermined limits, a common shut-down control means connected to all of said monitor receiver channels and operable in response to a deviation of the signal from any of said channels from values within said predetermined limits to shut down the transmitter, a separate persistence circuit means connected from each monitor receiver channel to said common shut-down control means, each persistence circuit means being operable to cause the delivery of a deviation signal from the associated channel to said shut-down control means only after the deviation signal has persisted for a period long enough to be indicative of a serious continuing malfunction rather than a harmless transient condition.

7. A system as claimed in claim 6 wherein each of said persistence circuit means comprises a digital counter which is operable to issue a shut-down control signal to said shut-down control means upon the achievement of a predetermined count value, said counter being enabled to commence counting upon the initiation of a deviation signal from the associated channel and to continue counting as long as said deviation signal persists, and means for periodically resetting all of said digital counters.

8. A system as claimed in claim 7 wherein said means for periodically resetting all of said digital counters comprises a separate reference digital counter operable to continuously repeat a counting cycle and to emit a reset signal to all of the others of said digital counters whenever a particular count value is achieved in said reference counter, the complete cycle period of operation of said reference counter being longer than the individual periods of operation of said digital counters from reset to said predetermined value when continuously enabled.

9. A monitor system for a radio navigation aid transmitter of the kind which transmits radio signals in a pattern defining a course plane in space, said monitor system including at least three separate monitor receiver antennas arranged at different displacement positions in space with respect to the course plane to monitor the signal pattern at each of said positions, a plurality of monitor receiver channels equal in number to the number of said monitor receiver antennas, a separate one of said monitor receiver channels being connected to each of said monitor receiver antennas for separately determining for each monitor receiver antenna the presence of deviations of the received signals from values within predetermined limits, said monitor receiver antennas being positioned at distances from the navigation aid transmitter antennas sufficient to receive and sample the fully defined radiation pattern to be received by the receivers of vehicles using said radio signals, said system including a switched scanning beam radio navigation aid transmitter to be monitored, said radio navigation aid transmitter including a plurality of individual antenna elements combined in an array, said transmitter being operable to switch the signal radiations in sequence to all of said transmitter antenna elements in rapid succession to thereby set up a switched scanning beam radiation pattern comprised of sequentially switched individual radiation beams from each transmitter antenna element, the radiation beams being modulated with two different navigation signal tones, the mix of navigation tone signals being different on the beams from different transmitter antenna elements, said different displacement positions of said monitor receiver antennas comprising positions angularly spaced between adjacent transmitter antenna elements so that each of said monitor receiver antennas is in a position to respond primarily to the two adjacent beams from said adjacent transmitter antenna elements to detect variations in the balance of the signals contributed by the respective adjacent beams.

10. A system as claimed in claim 1 wherein said system includes the radio navigation aid transmitter to be monitored, said transmitter including means for transmitting a standard radio frequency within the same frequency band with the transmitter signal carrier frequency and having a predetermined difference frequency from the carrier frequency, a connection from said navigation aid transmitter for carrying the standard radio frequency to said monitor receiver channels, each of said monitor receiver channels including a mixer connected to receive said standard radio frequency and operable to convert the modulated carrier frequency signal in said receiver channel to a difference frequency signal consisting of the difference between the carrier frequency signal and the standard frequency.

11. A system as claimed in claim 10 wherein the standard frequency is transmitted from said transmitter to said monitor receiver channels in the form of a frequency which is a predetermined fraction of said standard frequency to prevent high frequency energy losses, said monitor including a frequency multiplier to raise the frequency of the transmitted fractional frequency to the full standard frequency value.

12. A system as claimed in claim 1 wherein separate switching means are provided in each monitor receiver channel, said switching means being operable to switch synthesized deviation signals into said monitor receiver channels to check the integrity of said monitor receiver channels by determining whether or not said channels are operable for determining the presence of deviations from values within said predetermined limits.

13. A monitor system as claimed in claim 1 wherein the radio navigation aid signals transmitted by the navigation aid transmitter to be monitored to define the course plane in space comprise carrier signals modulated with different predetermined mixtures of two navigation signal tones at different positions with respect to said course plane, each of said monitor receiver channels being operable to determine whether or not the correct mixture of modulation tones exists in the signals received by the antenna associated with said monitor channel.

14. A monitor system for a radio navigation aid transmitter of the kind which transmits radio signals in a pattern defining a course plane in space, said monitor system including a plurality of separate monitor receiver antennas arranged at different displacement positions in space with respect to the course plane to monitor the signal pattern at each of said positions, a plurality of monitor receiver channels equal in number to the number of said monitor receiver antennas, a separate one of said monitor receiver channels being connected to each of said monitor receiver antennas for separately determining for each monitor receiver antenna the presence of deviations of the received signals from values within predetermined limits, the radio navigation aid signals transmitted by the navigation aid transmitter to be monitored to define the course plane in space comprising carrier signals modulated with different predetermined mixtures of two navigation signal tones at different positions with respect to said course plane, each of said monitor receiver channels being operable to determine whether or not the correct mixture of modulation tones exists in the signals received by the antenna associated with said monitor channel, said system including a radio navigation aid transmitter to be monitored, separate detector gating devices being provided for respectively detecting the presence of said separate modulation signal tones within each channel, connections from said transmitter to said detector gating devices for carrying said respective modulation tone signals from said transmitter to said gating devices, said gating devices being operable to gate on and off in synchronism with the individual cycles of said tone signals received from said transmitter to detect the depth of modulation of each of said tones in the radio carrier signals received by the associated monitor channel.

15. A system as claimed in claim 14 wherein said gating devices for detecting the depth of modulation of said two tone signals within each channel are connected to a common output, and means for reversing the phase of said tone gating signals from said transmitter for one of said tones supplied to one of said gating devices for each channel so that the d.c. component of the output signal from one of said gating devices is opposite in polarity to the d.c. component of the output from the other one of said gating devices for subtraction therefrom, and means for detecting the difference in said d.c. components of said detected depth of modulation signals to directly provide a difference in depth of modulation signal.

16. The combination of a radio navigation aid transmitter of the kind which transmits radio signals in a pattern defining a course plane in space and a monitor system for said transmitter, said monitor system including a plurality of separate monitor receiver antennas arranged at different displacement positions in space with respect to the course plane to monitor the signal pattern at each of said positions, a plurality of monitor receiver channels equal in number to the number of said monitor receiver antennas, a separate one of said monitor receiver channels being connected to each of said monitor receiver antennas for separately determining for each monitor receiver antenna the presence of deviations of the received signals from values within predetermined limits, said radio navigation aid transmitter including means for providing an identity code signal in the form of a predetermined signal tone which is modulated upon the radio navigation aid carrier signals in an interrupted Morse code pattern identifying the station from which the signals are transmitted, said system including an identity code monitor comprising an identity code generator operable to generate Morse code signals corresponding to the identification Morse code signals carried by said identity code signal tone modulation, and means associated with one of said monitor receiver channels for detecting the presence of identity code tone modulation and for comparing the resultant Morse code identity signals received from said transmitter with the identity code signals from said monitor identity code generator to conform the correctness of the identity code signals transmitted by said transmitter.

17. A monitor system for a radio navigation aid transmitter of the kind which transmits radio signals in a pattern defining a course plane in space, said monitor system including a plurality of separate monitor receiver antennas arranged at different displacement positions in space with respect to the course plane to monitor the signal pattern at each of said positions, a plurality of monitor receiver channels equal in number to the number of said monitor receiver antennas, a separate one of said monitor receiver channels being connected to each of said monitor receiver antennas for separately determining for each monitor receiver antenna the presence of deviations of the received signals from values within predetermined limits, means connected to a first one of said monitor receiver channels for measuring the power level of the carrier signal received by said first receiver channel, means for measuring the power level of a signal received in a second one of said monitor receiver channels, and means for comparing the carrier power level measurement from said power level measuring means for said first channel with said power level signal from said second channel to detect any deviations beyond predetermined limits in the relative power levels from said channels.

18. A system as claimed in claim 17 wherein the signal received in said second channel which is measured by said second channel power level measuring means comprises a detected modulation signal, said comparing means being operable to determine whether or not the depth of modulation indicated by said detected modulation signal is within predetermined limits while at the same time accomplishing a comparison in power levels in said first and second channels.

19. A system as claimed in claim 18 wherein said first channel comprises the center channel of the monitor system which is arranged to monitor the signals at the course plane in space, said system including a plurality of additional monitor receiver antennas and separate monitor receiver channels respectively associated therewith, a comparison means associated with each of said monitor receiver channels and operable to compare depth of modulation signals in each of said channels with power level signals from said center channel to accomplish a combined monitoring of the depth of modulation in each channel and monitoring of the power level in each channel with relation to the power level of the center channel.

* * * * *

PO-1050
(5/69)

UNITED STATES PATENT OFFICE
CERTIFICATE OF CORRECTION

Patent No. 3,818,476          Dated June 18, 1974

Inventor(s) J. ROLAND COULTER, WARREN HUNDLEY and SOL N. KOBLICK

It is certified that error appears in the above-identified patent and that said Letters Patent are hereby corrected as shown below:

Title page, Item [75] Inventors: the address of Sol N. Koblick should read --New City, N.Y.-- instead of "New York, N.Y.";
        Item [57] Abstract, line 9, "the" (second occurrence) should be omitted.
Column 2, third line from bottom, "invidual" should read --individual--.
Column 3, line 15, after "navigation" and before "46", insert --plane--;
        line 20, "path" should read --plane--;
        line 59, "application Ser. No. 104,668" should read --No. 3,774,214--;
        line 65, "connector" should read --connection--.
Column 5, line 37, "fo" should read --for--.
Column 8, line 16, "determined" should read --determine--.
Column 11, line 18, "directed" should read --direct--.
Column 17, line 4, "224" should read --244--;
        line 5, "the" (second occurrence) should read --to--.
Column 19, line 57, after "any" insert --one--.
Column 20, line 25, after "predetermined" insert --count--.
Column 23, line 17, "conform" should read --confirm--.

Signed and sealed this 17th day of September 1974.

(SEAL)
Attest:

McCOY M. GIBSON JR.          C. MARSHALL DANN
Attesting Officer            Commissioner of Patents